T. WAITE.
Cultivator.
No. 84,238. Patented Nov. 17, 1868.
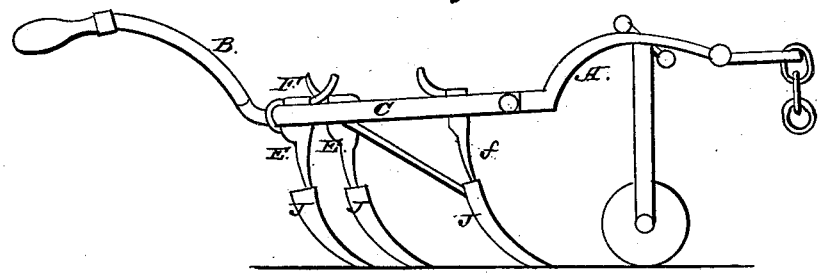
Fig. 1.
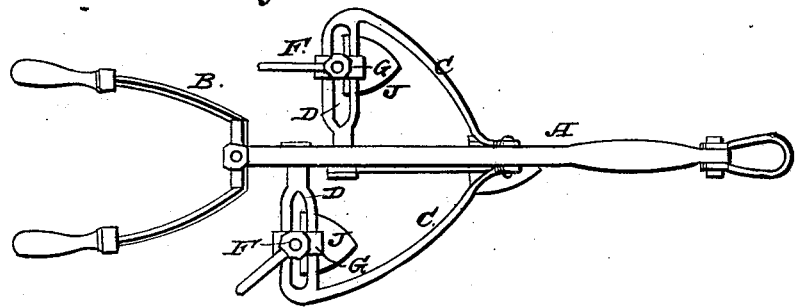
Fig. 2.
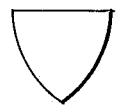 
Witnesses
J H Burridge
Frank S Alden
Inventor:
Thos Waite

THOMAS WAITE, OF PLYMOUTH, OHIO.

Letters Patent No. 84,238, dated November 17, 1868.

IMPROVEMENT IN CULTIVATORS.

The Schedule referred to in these Letters Patent and making part of the same.

*To all whom it may concern:*

Be it known that I, THOMAS WAITE, of Plymouth, in the county of Richland, and State of Ohio, have invented certain new and useful Improvements in Cultivators; and I do hereby declare that the following is a full and complete description of the construction and operation of the same, reference being had to the accompanying drawings, making part of this specification, in which—

Figure 1 is a side view of the cultivator.

Figure 2, a view of the top.

Figures 3 and 4, detached sections.

Like letters of reference refer to like parts in the different views.

The nature of this invention relates to a cultivator, so constructed that the shares can be moved near to or from each other, and thereby adapt it to different-width furrows, for the purpose of stirring the ground.

This cultivator is constructed of iron, and of which A is the beam, and B, the handles. To each side of said beam is secured a curved arm or side beam C, provided with slots, D, fig. 2, in which is fitted a standard, E, and therein secured by means of a hand-nut, F, the ends of the standards being screwed into the nuts, which have a bearing upon the upper side of the slot, on a washer or bridge, G, as shown in fig. 2.

I is also a standard, and is secured in the beam in such relation to standards E, as shown in fig. 1.

To each of the standards is secured a share, J, of the shape shown, but which, however, may be varied in shape as the nature of the work may require.

Figs. 3 and 4 represent modified forms of the shares, which may be used instead of those shown in figs. 1 and 2.

K is also a standard, in the lower end of which is a wheel, L, the purpose of which is to regulate the depth that the furrows shall enter the ground.

By the use of this cultivator the ground is thoroughly stirred, ank the grass and weeds rooted up and thereby destroyed. By adjusting the standards in the slots, a wider or narrower space of ground may be gone over, thereby adapting it to the various widths that field-crops may be planted.

This implement is light, strong, and durable, and thorough in the work for which it is intended.

What I claim as my improvement, and desire to secure by Letters Patent, is—

The side beams C, when provided with slots D for the insertion and adjustment of the standards E, in combination with the beam A, for the purpose set forth.

THOMAS WAITE.

Witnesses:
J. H. BURRIDGE,
W. H. BURRIDGE.